US007183733B2

(12) United States Patent
Suzuki et al.

(10) Patent No.: US 7,183,733 B2
(45) Date of Patent: Feb. 27, 2007

(54) OPENING AND CLOSING MEMBER CONTROL APPARATUS

(75) Inventors: Shintaro Suzuki, Kasugai (JP); Tomoaki Imaizumi, Hoi-gun (JP); Eiji Itami, Chiryu (JP); Masahiko Ito, Aichi-gun (JP); Masayuki Nomura, Toyota (JP)

(73) Assignees: Aisin Seiki Kabushiki Kaisha, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/327,439

(22) Filed: Jan. 9, 2006

(65) Prior Publication Data

US 2006/0164029 A1 Jul. 27, 2006

(30) Foreign Application Priority Data

Jan. 27, 2005 (JP) ............................ 2005-019296

(51) Int. Cl.
*H02P 7/00* (2006.01)

(52) U.S. Cl. ...................... 318/282; 318/286; 318/283; 318/466; 49/26; 49/28

(58) Field of Classification Search ................ 318/282, 318/286, 283, 466, 468; 49/26, 28
See application file for complete search history.

(56) References Cited

U.S. PATENT DOCUMENTS 5,218,282 A * 6/1993 Duhame ..................... 318/603
5,488,276 A * 1/1996 Nishibe ...................... 318/473
5,723,959 A * 3/1998 Iwata et al. ................. 318/447
5,734,245 A * 3/1998 Terashima et al. .......... 318/453
6,043,620 A * 3/2000 Koestler ..................... 318/282
6,178,699 B1 * 1/2001 Kawanobe et al. ........... 49/360
6,701,671 B1 3/2004 Fukumoto et al.
6,833,681 B2 * 12/2004 Fitzgibbon .................. 318/286
2004/0046401 A1 3/2004 Watanabe

FOREIGN PATENT DOCUMENTS

JP 2004-100309 A 4/2004
JP 3591349 B2 9/2004

* cited by examiner

*Primary Examiner*—Rina Duda
(74) *Attorney, Agent, or Firm*—Buchanan Ingersoll & Rooney PC

(57) ABSTRACT

An opening and closing member control apparatus includes: an open-command receiving portion for receiving a first open command of a first open and close command inputting member and a second open command of a second open and close command inputting member, which performs a second open command input and a second close command input by a unique operation thereof, a close-command receiving portion for receiving a first close command of the first open and close command inputting member and a second close command of the second open and close command inputting member, and a controlling portion for performing an opening operation and a closing operation of an opening and closing member based on a condition of the opening and closing member, in response to the unique operation of the second open and close command inputting member.

20 Claims, 6 Drawing Sheets

OPENING AND CLOSING MEMBER CONTROL APPARATUS

CROSS REFERENCE TO RELATED APPLICATIONS

This application is based on and claims priority under 35 U.S.C. § 119 with respect to Japanese Patent Application 2005-019296, filed on Jan. 27, 2005, the entire content of which is incorporated herein by reference.

FIELD OF THE INVENTION

This invention generally relates to an opening and closing member control apparatus that controls an operation of an opening and closing member.

BACKGROUND

Opening and closing member control apparatus, according to which an opening and closing member such as a slide door and a back door provided at a vehicle, is operated by an opening and closing member-driving means such as a motor, have been known conventionally. As one of examples of such conventional opening and closing member control apparatus, as disclosed in JP2004-100309A (corresponding to US2004-0046101A1), an opening and closing member control apparatus is configured to operate an opening and closing member-driving mans in a predetermined rotational direction (a closing direction) under the condition that a hand and so on of a person is in a touch with an opening and closing member when the opening and closing member is operated in a closing direction. That is, according to this disclosed opening and closing control apparatus, the opening and closing member-driving means assists a manual operation of the opening and closing member implemented by a person. In other words, unless a hand and so on of a person is in touch with the opening and closing member when the opening and closing member is operated, the opening and closing member-driving means is not activated.

As another example of the opening and closing member control apparatus, as disclosed in Japanese Patent No. 3591349 (corresponding to U.S. Pat. No. 6,701,671B1), an opening and closing member control apparatus is provided with a member (i.e., a directional handle) which selectively implements an open command input for opening an opening and closing member and a close command input for closing the opening and closing member. This opening and closing member control apparatus is further provided with an open-command receiving means for receiving an open command input and a close-command receiving means for receiving a close command input. Therefore, it is possible, by use of a directional inside door handle that is mounted inside a vehicle, to selectively implement an open command input, and a close command input, of the opening and closing member, relative to the open-command receiving means and the close-command receiving means. Like wise, it is possible, by use of a directional outside door handle that is mounted outside a vehicle, to selectively implement an open command input, and a close command input, of the opening and closing member, relative to the open-command receiving means and the close-command receiving means.

However, when such opening and closing member control apparatus described above should be actually mounted on a vehicle, restraints placed on a vehicle design may on occasions cause unavailability of a directional handle, which selectively implements an open command input and a close command input, as open and close command inputting means such as an inside door handle and an outside door handle. In such circumstances, a vehicle may be provided with a combination of a directional handle and a non-directional handle that implements open and close command inputs by a unique operation thereof. In such case, the opening and closing member control apparatus may receive directional open and close commands and a non-directional open and close command, which may hinder an appropriate opening and closing operation of the opening and closing member. Moreover, if a command receiving means, which receives directional open and close commands, and another command receiving means, which receives a non-directional open and close command, are individually or separately incorporated in the apparatus, there is a possibility that a configuration of the apparatus may be complicated and a manufacturing cost thereof may be raised.

The present invention has been made in view of the above circumstances, and provides an opening and closing member control apparatus which includes a simple structure and controls appropriately an opening and closing operation of an opening and closing member, in circumstances where an open and close command inputting means (e.g., a door handle), which performs directional open and close command inputs, and an open and close command inputting means (e.g., a door handle), which performs only a non-directional open and close command input, are both provided.

SUMMARY OF THE INVENTION

According to an aspect of the present invention, an opening and closing member control apparatus includes: an opening and closing member-driving means for driving an opening and closing member provided at a vehicle; a condition monitoring means for monitoring a condition of the opening and closing member; a condition storing means for storing, therein, the condition of the opening and closing member monitored by the condition monitoring means; an open-command receiving means for receiving an open command by which the opening and closing member-driving means is activated for opening the opening and closing member; a close-command receiving means for receiving a close command by which the opening and closing member-driving means is activated for closing the opening and closing member; a first open and close command inputting means for selectively performing a first open command input, by which the open command is inputted to the open-command receiving means, and a first close command input, by which the close command is inputted to the close-command receiving means; a second open and close command inputting means separated from the first open and close command inputting means and for performing, based on a unique operation of the second open and close command inputting means, a second open command input, by which the open command is inputted to the open-command receiving means, and a second close command input, by which the close command is inputted to the close-command receiving means; and a controlling means for determining an activation of the opening and closing member-driving means between an opening operation for opening the opening and closing member and a closing operation for closing the opening and closing member based on a condition of the opening and closing member and for controlling the opening and closing member-driving means based on the determination, when the unique operation of the second open and close command inputting means, which is associated with the second open command input and the second close command input, is performed.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
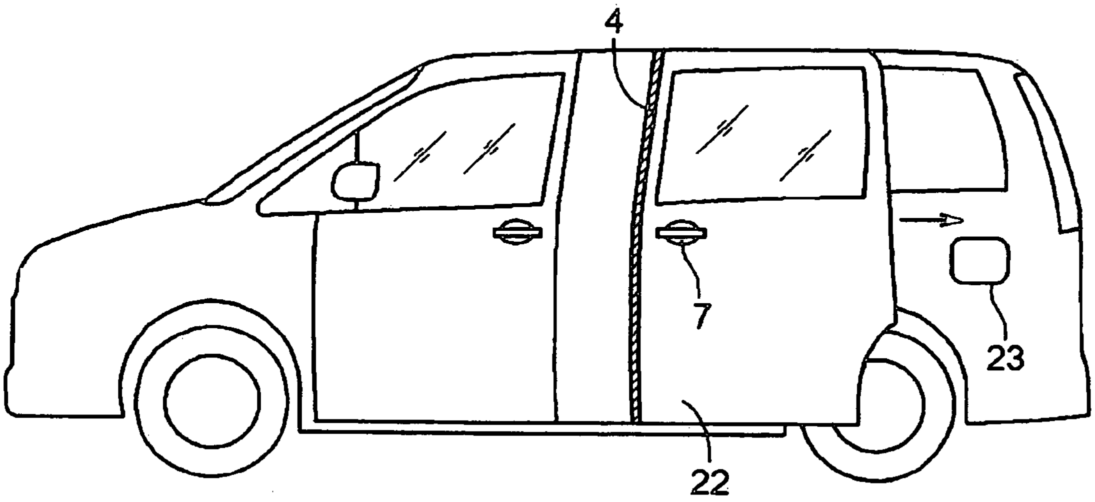
FIG. 1 is a side view illustrating a slide door as seen from an outside of a vehicle.
Figure 2:
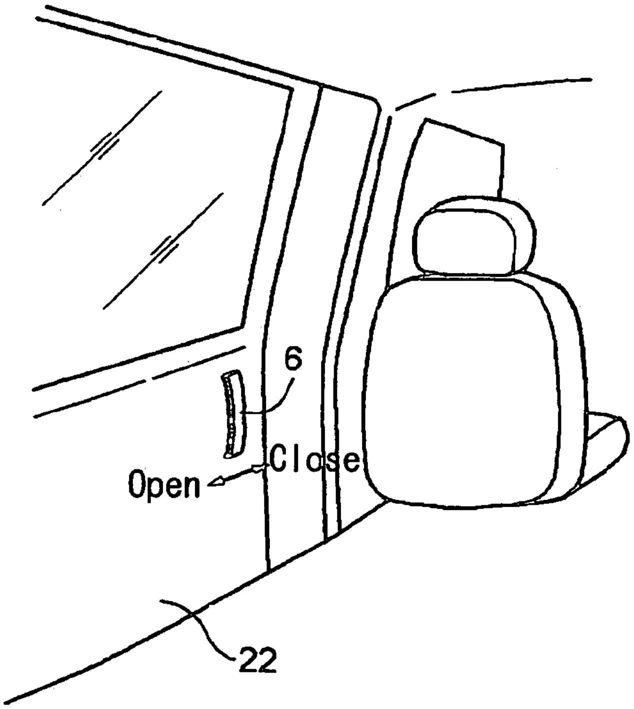
FIG. 2 is a view illustrating an inside of the slide door as seen from an inside of the vehicle.

As illustrated in FIGS. 1 and 2, a slide door 22 is provided with an outside door handle 7, which transmits or inputs an operation command of the slide door 22 from a vehicle outside, and an inside door handle 6, which transmits or inputs an operation command of the slide door 22 from a vehicle inside. Further provided is an entrapment-detecting sensor 4 at an opening portion of the slide door 22.

The inside door handle 6 is operated or shifted in rearward and forward directions of a vehicle, i.e., in a direction for opening the slide door 22 and in a direction for closing the slide door 22. That is, when the inside door handle 6 is operated in the rearward direction of the vehicle, an open command input (a first open command input) of the slide door 22 is carried out. Likewise, when the inside door handle 6 is operated in the forward direction of the vehicle, a close command input (a first close command input) of the slide door 22 is carried out. This inside door handle 6 is automatically maintained, or automatically returns, to a neutral position when it is not operated. As described above, the inside door handle 6 serves as a first open and close command inputting means of the opening and closing member control apparatus according to the embodiment of the present invention.

The outside door handle 7 transmits or inputs an operation command (a second open operation command and a second close operation command) of the slide door 22 by pulling in a laterally outward direction of the vehicle, i.e., in response to a unique operation thereof. This outside door handle 7 is automatically maintained, or automatically returns, to a neutral position when it is not operated. As described above, the outside door handle 7 serves as a second open and close command inputting means of the opening and closing member control apparatus according to the embodiment of the present invention.

The entrapment-detecting sensor 4 detects entrapment of an obstacle between the slide door 22 and a vehicle when the slide door 22 is closed. As an example of such entrapment-detecting sensor 4, a piezoelectric substance can be equipped to the opening of the slide door 22. An electronic control unit (ECU) 1 (illustrated in FIG. 3) described later determines that an abnormal stop condition of the slide door 22 is satisfied once this entrapment-detecting sensor 4 detects an entrapment of an obstacle. Alternatively or in addition, the ECU 1 can determine that the abnormal stop condition of the slide door 22 is satisfied when the entrapment-detecting sensor 4 detects entrapments of an obstacle continuously and more than once.

Figure 3:
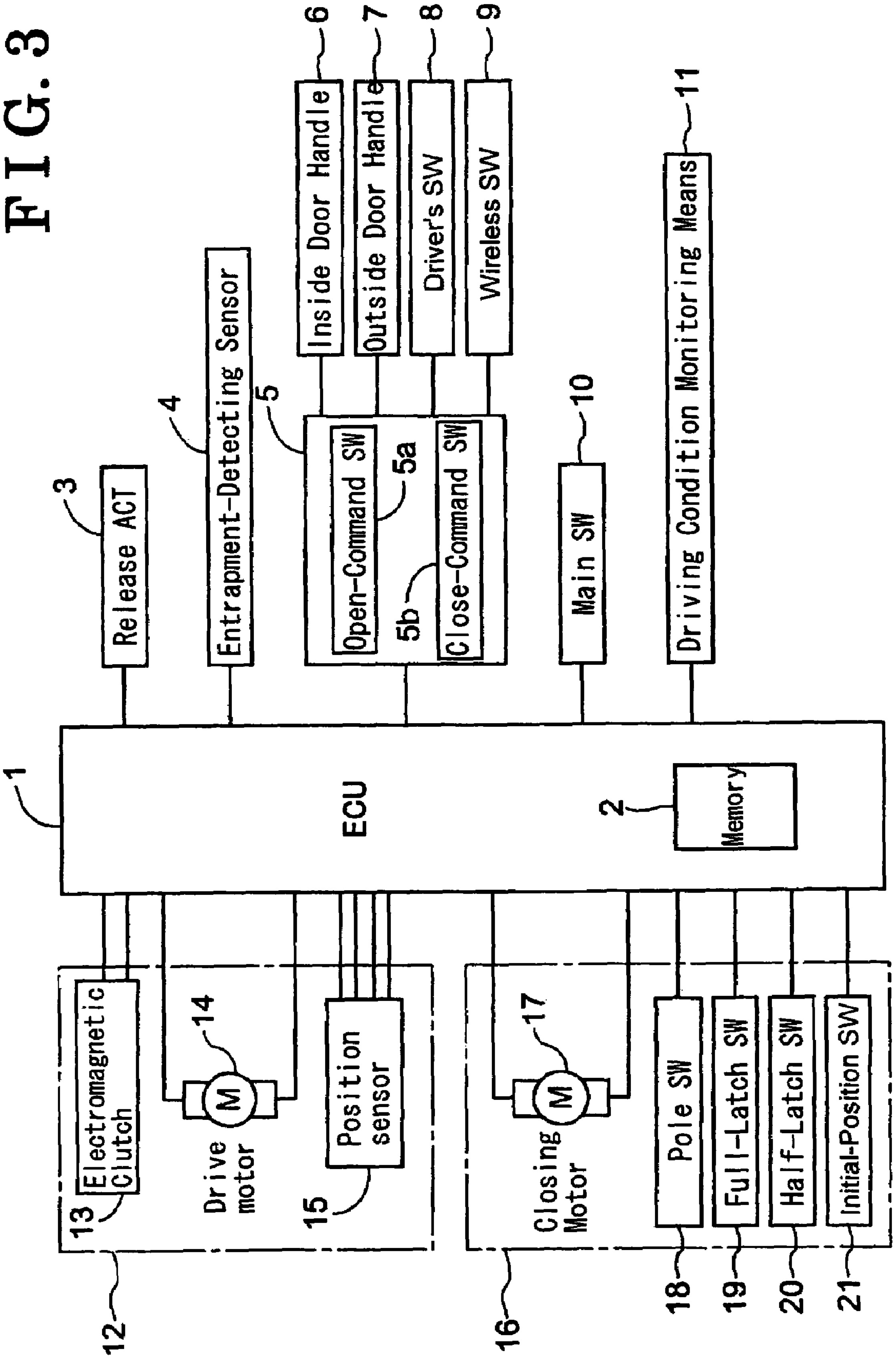
FIG. 3 is a block view illustrating a function of an opening and closing member control apparatus according to an embodiment of the present invention.

As illustrated in FIG. 3, the ECU 1, which serves as a controlling means of the opening and closing member control apparatus according to the embodiment of the present invention, incorporate, therein, a memory storage 2 as a condition storing means which stores various information necessary and transmits control commands. Various information, which is inputted into the ECU 1, includes obstacle detecting information detected by the entrapment-detecting sensor 4, an open command of an open-command switch 5*a* (i.e., an open-command receiving means), a close command of a close-command switch 5*b* (i.e., a close-command receiving means), switch operation information, either an automatic operation or a manual operation of the slide door 22, of a main switch 10, vehicle driving condition information of a driving condition monitoring module 11 (i.e., a driving condition monitoring means), position information of the slide door 22 detected by a position sensor 15, gear position information by an initial position switch 21 that detects a gear position of a closing motor 17 that operates a latch of the slide door 22, full-latch information, whether or not the latch is at a lock position (a full-latch position), of a full-latch switch 19, pawl switch information, whether a pawl supports the latch at the full-latch position, of a pawl switch 18, and half-latch information, whether the latch is at a half-latch position, of a half-latch switch 20. The vehicle driving condition information of the driving condition monitoring module 11 includes on/off information of an ignition switch, shift position information, parking brake information, foot brake information, accelerator opening degree information, and vehicle speed information. The position sensor 15, the pawl switch 18, the full-latch switch 19 and the half-latch switch 20 serve as a condition monitoring means for monitoring a condition or position of the slide door 22.

The control commands, which are transmitted or outputted by the ECU 1, include a control command to a release actuator (release ACT) 3 for controlling the latch to an un-lock condition, a control command to an electromagnetic clutch 13 as a driving force transmitting condition switching means which switches a driving force transmitting condition and a driving force non-transmitting condition, the driving force transmitting condition in which a driving force of the drive motor 14 is transmitted to the slide door 22 and the driving force non-transmitting condition in which a driving force of the drive motor 14 is prohibited from being transmitted to the slide door 22, a control command to the drive motor 14 of a drive unit 12, and a control command to the closing motor 17 of a closing unit 16.

The ECU 1 controls the electromagnetic clutch 13 between the driving force transmitting condition and the driving force non-transmitting condition when the ECU 1 determines that the abnormal stop condition of the slide door 22 has been satisfied. More specifically, when the ECU 1 determines that the abnormal stop condition of the slide door 22 has been satisfied, the ECU 1 discontinues activation of the drive motor 14 of the drive unit 12, controls the electromagnetic clutch 13 at the driving force non-transmitting condition, and allows a manual operation of the slide door 22, i.e., prohibits an automatic operation of the slide door 22. In such circumstances, if the slide door 22 is stopped unusually due to entrapment of an obstacle, a manual operation of the slide door 22 can be carried out and such entrapment of the obstacle can be ended or released. Such switching operation of the electromagnetic clutch 13 between an on state (the driving force transmitting condition) and an off state (the driving force non-transmitting condition) can be controlled automatically by the ECU 1 and/or on the basis of an outputted command of the main switch 10 operated manually by a person.

Table 1 summarizes operations of a switch unit 5 having the open-command switch 5*a* and the close-command switch 5*b* in three cases where the slide door 22 is operated respectively by the outside door handle 7 and the inside door handle 6. As is obvious from Table 1, when the open command input is carried out by the operation of the inside door handle 6, only the open-command switch 5*a* is turned on. When the close command input is carried out by the operation of the inside door handle 6, only the close-command switch 5*b* is turned on. When the open or close command input is carried out by the operation of the outside door handle 7, the open-command switch 5*a* and the close-command switch 5*b* are both turned on. That is, when the open or close command input is carried out by the outside door handle 7, the ECU 1 determines that the open command input and the close command input were both carried out. As described above, in the switch unit 5, the two switches, the open-command switch 5*a* and the close-command switch 5*b*, receives the aforementioned three types command inputs by the inside door handle 6 and the outside door handle 7 and recognizes the respective inputs individually.

TABLE 1

| Operation | Open-Command SW | Close-Command SW |
|---|---|---|
| Open or Close Command Input by Outside Door Handle | ON | ON |
| Open Command Input by Inside Door Handle | ON | OFF |
| Close Command Input by Outside Door Handle | OFF | ON |

The ECU 1 receives, from the switch unit 5, three types of command inputs (1) the open command input; 2) the close command input; and 3) the open command input and the close command input). As is obvious from Table 2, the ECU 1 selectively outputs to the drive motor 14 a command for opening the slide door 22 (a command for an opening operation) and a command for closing the slide door 22 (a command for a closing operation), on the basis of the command input transmitted from the switch unit 5 and the condition or position of the slide door 22 of the condition monitoring means. Here, according to the embodiment of the present invention, "a closed state" and "a fully closed state" represent that the position sensor 15 detects that the slide door 22 is currently fully closed and at a lock condition (the pawl switch 18 and the full-latch switch 19 both being at an on state). Likewise, "an open state" and "a fully open state" represent that the position sensor 15 detects that the slide door 22 is currently fully open and at a lock condition (the pawl switch 18 and the full-latch switch 19 both being at an on state).

When the ECU 1 receives the open command input of the inside door handle 6, the ECU 1 activates the drive motor 14 for the opening operation, and the slide door 22 is operated in an opening direction. If the drive motor 14 is already being activated for the opening operation when the ECU 1 receives the open command input of the inside door handle 6, the activation of the drive motor 14 for the opening operation is continued. Likewise, when the ECU 1 receives the close command input of the inside door handle 6, the ECU 1 activates the drive motor 14 for the closing operation, and the slide door 22 is operated in a closing direction. If the drive motor 14 is already being activated for the closing operation when the ECU 1 receives the close command input of the outside door handle 7, the activation of the drive motor 14 for the closing operation is continued.

On the other hand, when the open or close command input is implemented by the outside door handle 7 (e.g., a non-directional handle) that does not carry a sense of direction, the ECU 1 controls the drive motor 14 as summarized in Table 2.

TABLE 2

| Slide Door State | Open-Command SW | Close-Command SW | Drive Motor |
|---|---|---|---|
| Stationary at a closed state | Detect | Ignore | → Opening |
| Stationary at an open state | Ignore | Detect | → Closing |
| Opening | Ignore | Detect | → Closing (Reverse) |
| Closing | Detect | Ignore | → Opening(Reverse) |

As is obvious from Table 2, the ECU 1 detects an on/off state of the open-command switch 5*a* when the slide door 22 remains stationary at the closed state, and activates the drive motor 14 for the opening operation if the open-command switch 5*a* is at the on state. The ECU 1 detects an on/off state of the close-command switch 5*b* when the slide door 22 remains stationary at the open state, and activates the drive motor 14 for the closing operation if the close-command switch 5*b* is at the on state. The ECU 1 detects the on/off state of the close-command switch 5*b* when the slide door 22 is being operated in the opening direction, and activates the drive motor 14 in a reverse rotational direction (here, a closing operation) if the close-command switch 5*b* is at the on state. The ECU 1 detects the on/off state of the open-command switch 5*b* when the slide door 22 is being operated in the closing direction, and activates the drive motor 14 in a reverse rotational direction (here, an opening operation) if the open-command switch 51 is at the on state. As described above, an on/off state of one of the switches 5*a* and 5*b* can be ignored in response to the condition or position of the slide door 22.

For example, during the opening operation of the slide door 22, when at least one of the following operations are implemented: (1) the close command input is implemented by the inside door handle 6; and (2) the close command input (or the open command input) is implemented by the outside door handle 7, the ECU 1 activates the drive motor 14 in a reverse rotational direction, i.e., for the closing operation. During the opening operation of the slide door 22, when the aforementioned inputs are not implemented, the ECU 1 continuously operates the slide door 22 in the opening direction. That is, while the slide door 22 is being operated in the opening direction, the ECU 1 merely or only determines the presence or absence of the close command input. Likewise, during the closing operation of the slide door 22, when at least one of the following operations are implemented: (1) the open command input is implemented by the inside door handle 6; and (2) the open command input (or the close command input) is implemented by the outside door handle 7, the ECU 1 activates the drive motor 1 in a reverse rotational direction, i.e., for the opening operation. During the closing operation of the slide door 22, when the aforementioned inputs are not implemented, the ECU 1 continuously operates the slide door 22 in the closing direction. That is, while the slide door 22 is being operated in the closing direction, the ECU 1 merely or only determines the presence or absence of the open command input.

As described above, the ECU 1 selectively transmits to the drive motor 14 the command for the opening operation or the command for the closing operation, on the basis of the condition or position of the slide door 22 and the outputted command of the switch unit 5.

Figure 4:
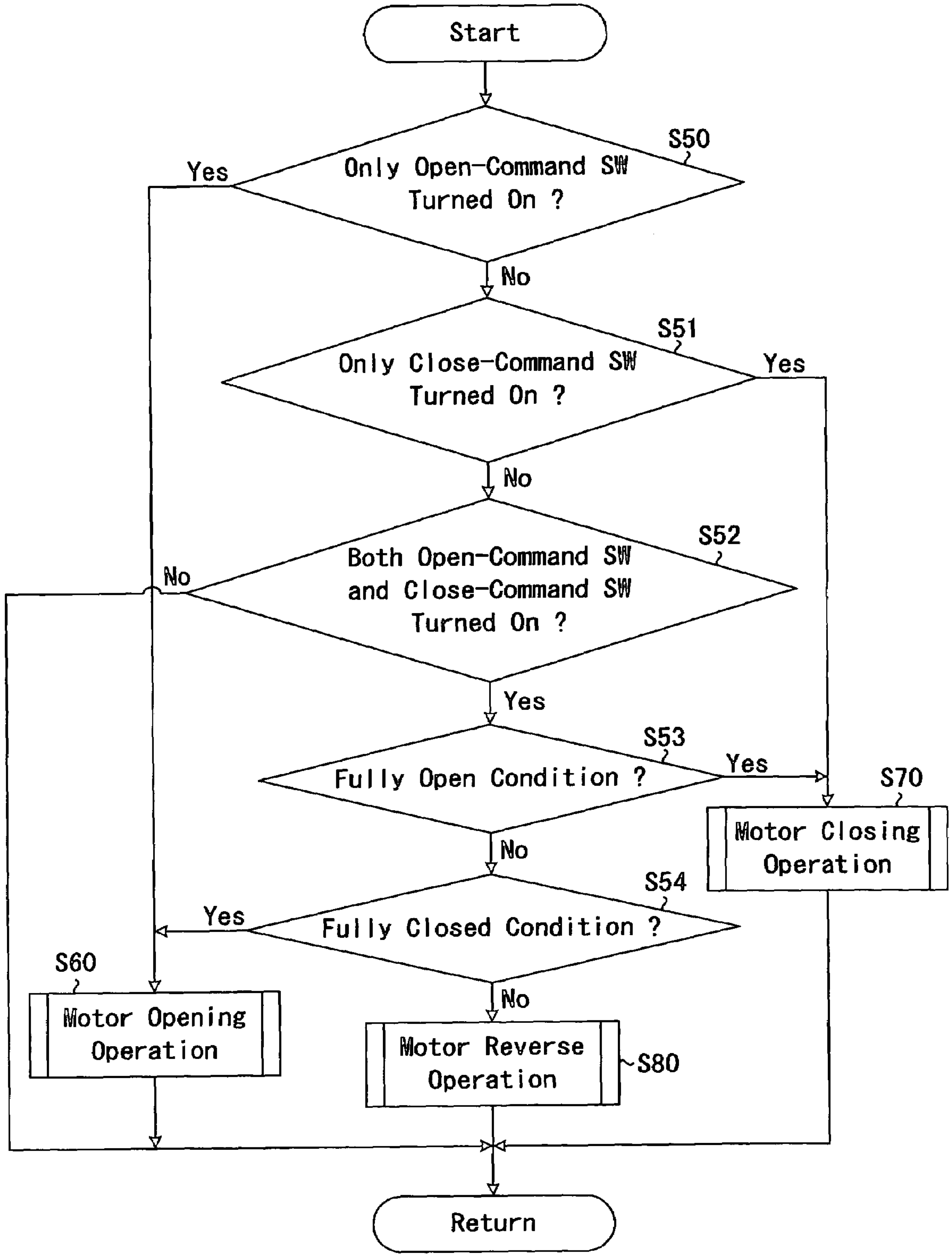
FIG. 4 is a flowchart for explaining a control of an activation of a drive motor.

Next, described below is a control of an operation of the drive motor 14 by the ECU 1 with reference to a flowchart illustrated in FIG. 4.

In step S50, the ECU 1 determines whether only the open-command switch 5*a* is at the on state. When only the open-command switch 5*a* is at the on state, it represents that the open command input was implemented by the inside door handle 6. When the ECU 1 determines that only the open-command switch 5*a* is at the on state (an affirmative answer "Yes" is obtained in step S50), the program proceeds to step S60, wherein the ECU 1 activates the drive motor 14 for the opening operation. On the other hand, when the ECU 1 doest not determine that only the open-command switch 5*a* is at the on state (a negative answer "No" is obtained in step S50), the program proceeds to step S51, wherein the ECU 1 determines whether only the close-command switch 5*b* is at the on state. When only the close-command switch 5*b* is at the on state, it represents that the close command input was implemented by the inside door handle 6. When the ECU 1 determines that only the close-command switch 5*b* is at the on state (an affirmative answer "Yes" is obtained step S51), the program proceeds to step 70, wherein the ECU 1 activates the drive motor 14 for the closing operation.

When a negative answer "No" is obtained both in step S50 and step S51, the program proceeds to step S52, wherein the ECU 1 determines whether both the open-command switch 5*a* and the close-command switch 5*b* are at the on state. When both the open-command switch 5*a* and the close-command switch 5*b* are at the on state, it represents that the open or close command input of the slide door 22 was carried out by the outside door handle 7. When both the open-command switch 5*a* and the close-command switch 5*b* are at the on state, the program proceeds to step S53, wherein the ECU 1 determines whether the slide door 22 is at the fully open condition, on the basis of a monitoring result by the condition monitoring means. On the other hand, when the ECU 1 doest not determine that both the open-command switch 5*a* and the close-command switch 5*b* are at the on state, the ECU 1 determines that both the open-command switch 5*a* and the close-command switch 5*b* are at the off state. The program illustrated in FIG. 4 then returns to the first step thereof.

When the ECU 1 determines in step S53 that the slide door 22 is at the fully open state, the program proceeds to step S70, wherein the ECU 1 activates the drive motor 14 for the closing operation. When the ECU 1 determines in step S53 that the slide door 22 is not at the fully open state, the program proceeds to step S54, wherein the ECU 1 determines whether the slide door 22 is at the fully closed state, on the basis of a monitoring result of the condition monitoring means. When the ECU 1 determines in step S54 that the slide door 22 is at the fully closed state, the program proceeds to step S60, wherein the ECU 1 activates the drive motor 14 for the opening operation. On the other hand, when the ECU 1 determines in step S54 that the slide door 22 is not at the fully closed state, it represents that the slide door 2 is being operated at a position being different from the fully closed state and the fully open state. Therefore, the program proceeds to step S80, wherein the ECU 1 activates the drive motor 14 to rotate in a reverse rotational direction and implements a reverse operation (opening or closing operation) of the slide door 22.

Figure 5:
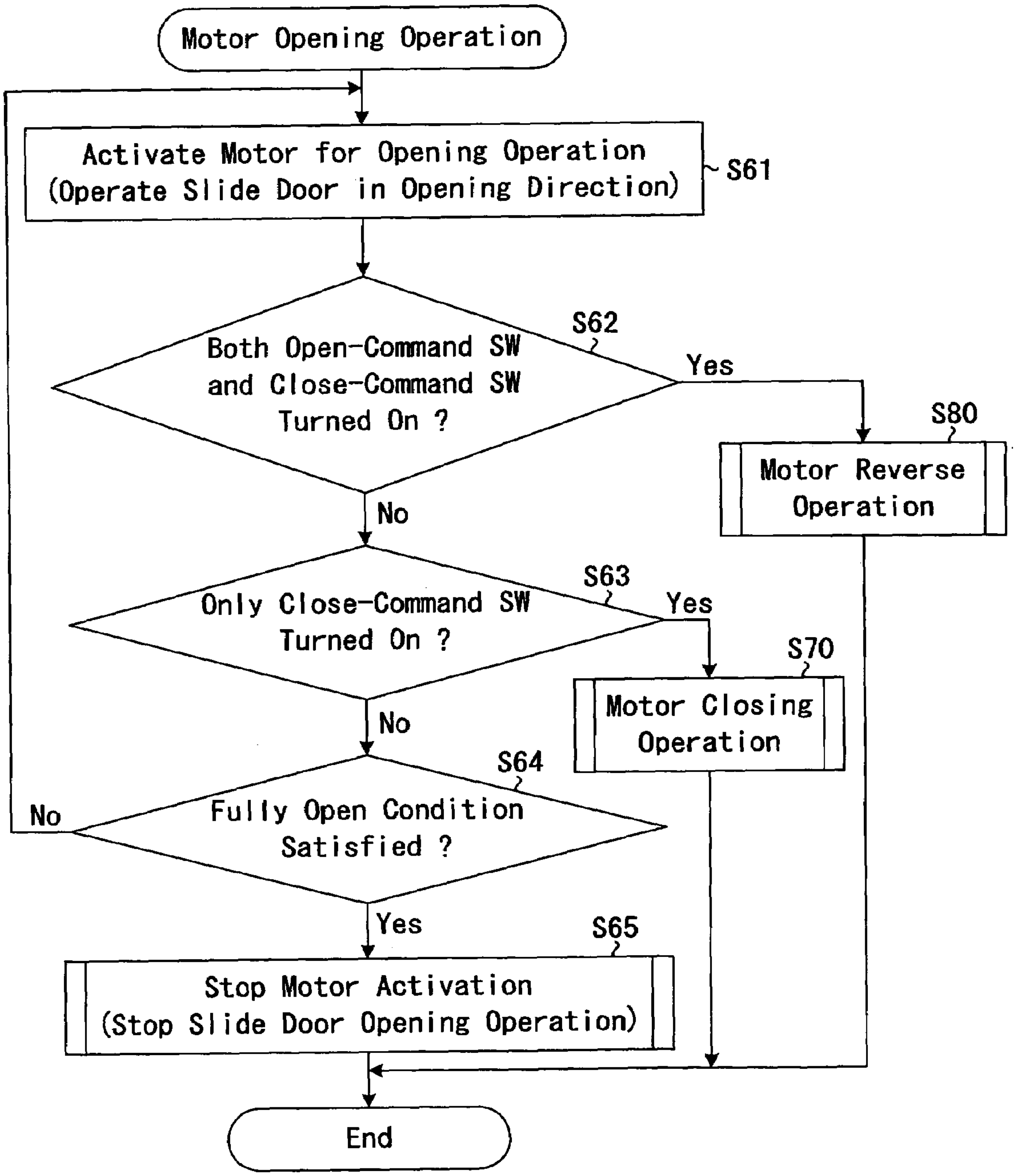
FIG. 5 is a flowchart for explaining a control of an activation of the drive motor for an opening operation.

Next, described below is a control of an activation of the drive motor 14 for the opening operation with reference to flowchart illustrated in FIG. 5.

In step S61, the ECU 1 activates the drive motor 14 for the opening operation and operates the slide door 22 in the opening direction. Next, the ECU 1 determines, in step S62, whether both the open-command switch 5*a* and the close-command switch 5*b* are at the on state. That is, the ECU 1 determines, in step S62, whether the open or close command input was implemented by the outside door handle 7 while the slide door 22 is being operated in the opening direction. When the open and close command input was implemented by the outside door handle 7 while the slide door 22 is being operated in the operation direction (an affirmative answer "Yes" is obtained in step S62), the program proceeds to step S80, wherein the ECU 1 activates the drive motor 14 to rotate in a reverse rotational direction (here, the closing operation) and operates the slide door 22 in the closing direction.

On the other hand, when the ECU 1 determines in step S62 the absence of the open or close command input of the outside door handle 7 (a negative answer "No" in step S62), the program proceeds to step S63, wherein the ECU 1 determines whether only the close-command switch 5*b* is at the on state. The ECU 1 determines in step S63 the presence or absence of the close command input of the inside door handle 6 while the slide door 22 is being operated in the opening direction. When the ECU 1 determines in step S63 the presence of the close command input of the inside door handle 6 while the slide door 22 is being operated in the opening direction, the program proceeds to step S70, wherein the ECU 1 activates the drive motor 14 for the closing operation and operates the slide door 22 in the closing direction.

When neither the open or close command input of the outside door handle 7 nor the close command input of the inside door handle 6 are identified by the ECU 1 since the initiation of the opening operation of the slide door 22 in step S61, the program determines in step S64 whether the current condition of the slide door 22 satisfies a fully open condition, on the basis of a monitoring result of the condition monitoring means. The ECU 1 determines that the fully open condition has been satisfied when the slide door 22 is at the fully open state. When the ECU 1 determines in step S64 that the fully open condition has been satisfied, the program proceeds to step S65, wherein the ECU 1 discontinues the activation of the drive motor 14 and stops the slide door 22. When the ECU 1 determines in step S64 that the fully open condition has not been satisfied, the program returns to step S61 and the ECU 1 continues activation of the drive motor 14 for the opening operation, i.e., operation of the slide door 22 in the opening direction.

Figure 6:
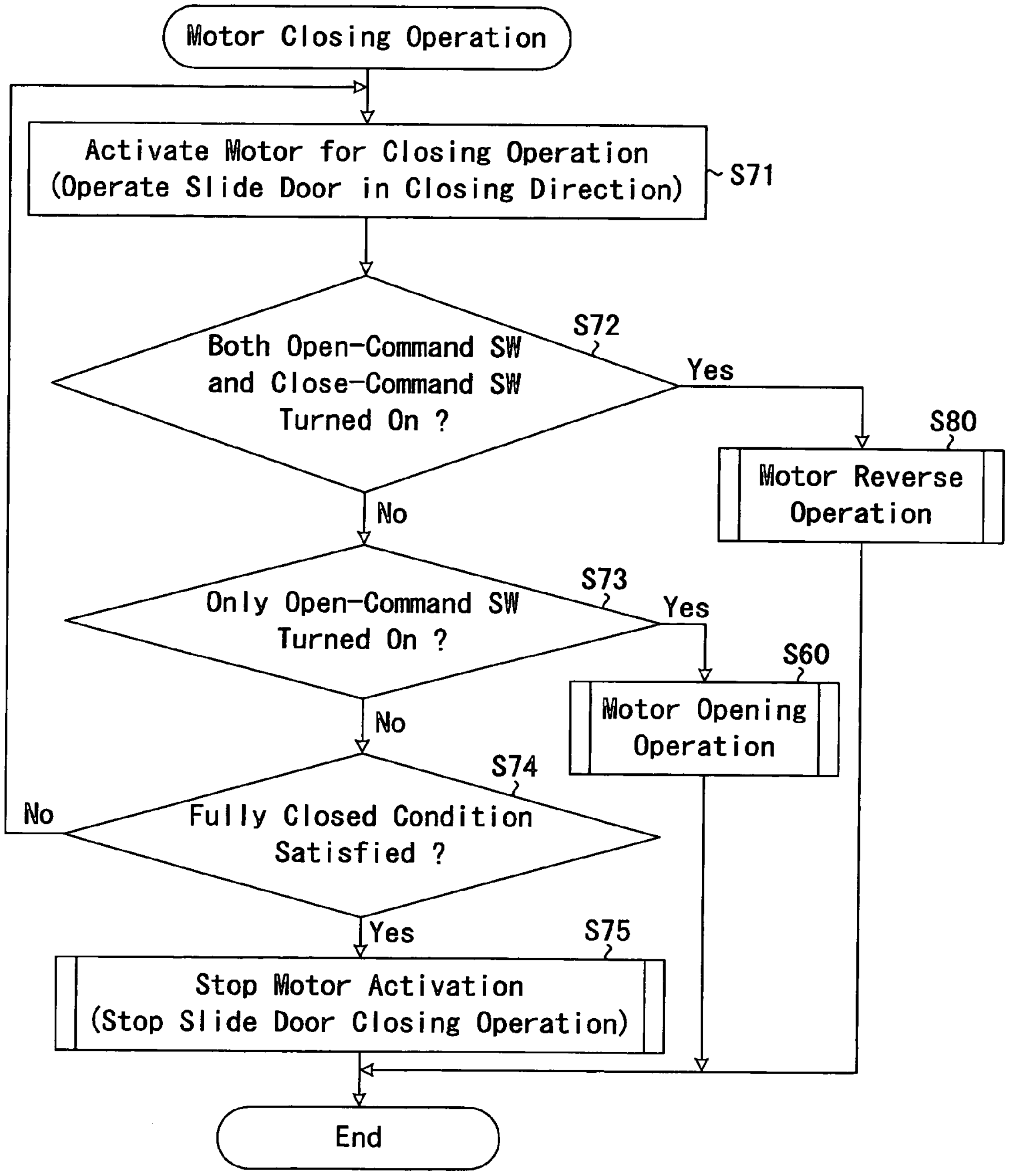
FIG. 6 is a flowchart for explaining a control of an activation of the drive motor for a closing operation.

Next, described below is a control of an activation of the drive motor 14 for the closing operation with reference to flowchart illustrated in FIG. 6.

In step S71, the ECU 1 activates the drive motor 14 for the closing operation and operates the slide door 22 in the closing direction. Next, the ECU 1 determines, in step S72, whether both the open-command switch 5*a* and the close-command switch 5*b* are at the on state. That is, the ECU 1 determines, in step S72, whether the open or close command input was implemented by the outside door handle 7 while the slide door 22 is being operated in the closing direction. When the open or close command input was implemented by the outside door handle 7 while the slide door 22 is being operated in the operation direction (an affirmative answer "Yes" is obtained in step S72), the program proceeds to step S80, wherein the ECU 1 activates the drive motor 14 to rotate in a reverse rotational direction (here, the opening operation) and operates the slide door 22 in the opening direction.

On the other hand, when the ECU 1 determines in step S72 the absence of the open or close command input of the outside door handle 7 (a negative answer "No" in step S72), the program proceeds to step S73, wherein the ECU 1 determines whether only the open-command switch 5*a* is at the on state. The ECU 1 determines in step S73 the presence or absence of the open command input of the inside door handle 6 while the slide door 22 is being operated in the closing direction. When the ECU 1 determines in step S73 the presence of the open command input of the inside door handle 6 while the slide door 22 is being operated in the closing direction, the program proceeds to step S60, wherein the ECU 1 activates the drive motor 14 for the opening operation and operates the slide door 22 in the opening direction.

When neither the open or close command input of the outside door handle 7 nor the open command input of the inside door handle 6 are identified by the ECU 1 since the initiation of the closing operation of the slide door 22 in step S71, the program determines in step S74 whether the current condition of the slide door 22 satisfies a fully closed condition, on the basis of a monitoring result of the condition monitoring means. The ECU 1 determines that the fully closed condition has been satisfied when the slide door 22 is at the fully closed state. When the ECU 1 determines in step S74 that the fully closed condition has been satisfied, the program proceeds to step S75, wherein the ECU 1 discontinues the activation of the drive motor 14 and stops the slide door 22. When the ECU 1 determines in step S74 that the fully closed condition has not been satisfied, the program returns to step S71 and the ECU 1 continues activation of the drive motor 14 for the closing operation, i.e., an operation of the slide door 22 in the closing direction.

Figure 7:
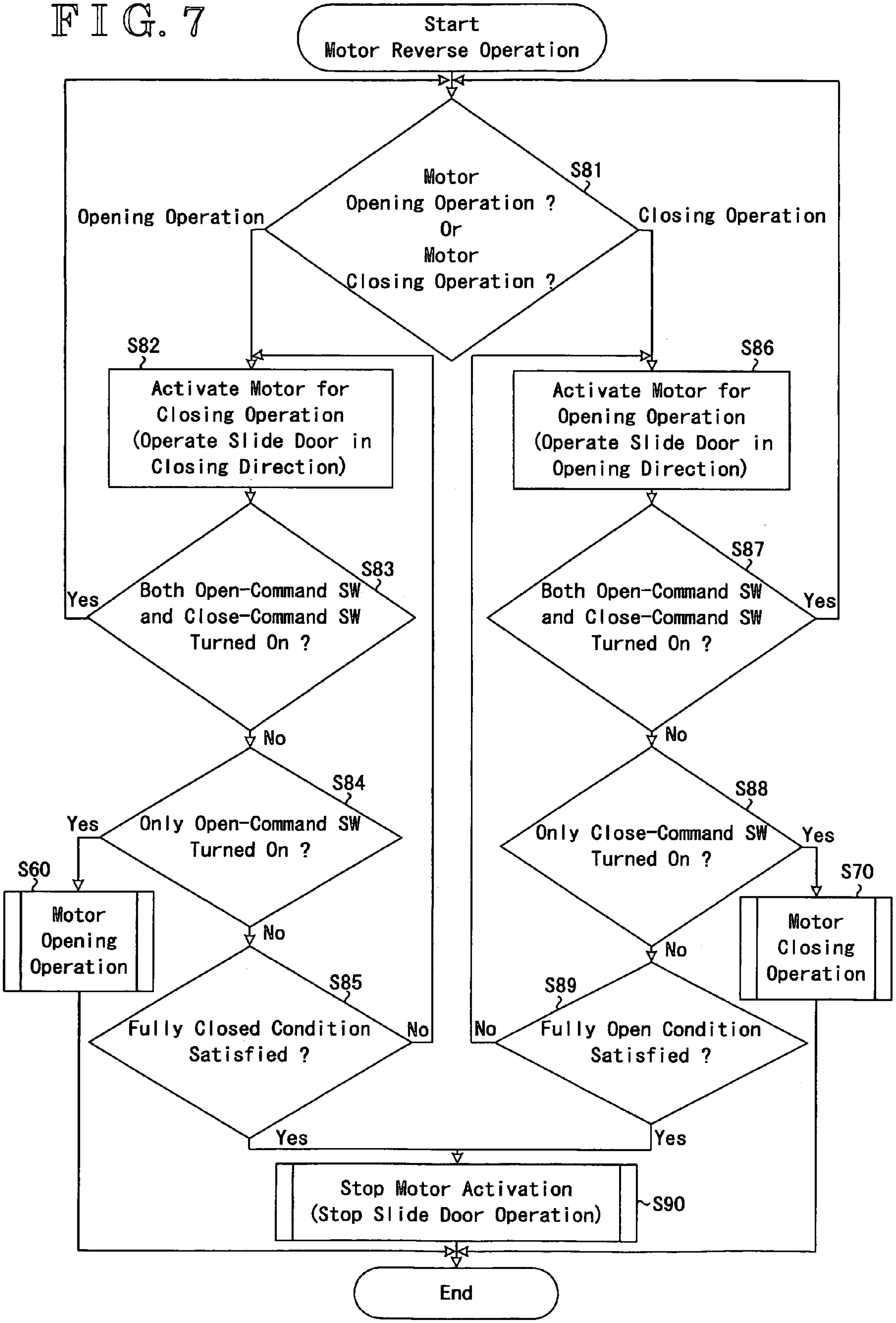
FIG. 7 is a flowchart for explaining a control of an activation of the drive motor for a reverse rotational operation.

Next, described below is activation of the drive motor 14 in a reverse rotational direction and operation of the slide door 22 in a reverse direction with reference to flowchart illustrated in FIG. 7.

In step S81, the ECU 1 determines, on the basis of a monitoring result of the condition monitoring means, whether the drive motor 14 is being activated for the opening operation or the closing operation. When the ECU 1 determines in step S81 that the drive motor 14 is being activated for the opening operation, i.e., the slide door 22 is being operated in the opening direction, the program proceeds to step S82. On the other hand, when the ECU 1 determines in step S82 that the drive motor 14 is being activated for the closing operation, i.e., the slide door 22 is being operated in the closing direction, the program proceeds to step S86.

In step S82, the ECU 1 activates the drive motor 14 in a reverse rotational direction (closing operation) and operates the slide door 22 in the closing direction. In step S83, the ECU 1 determines whether both of the open-command switch 5*a* and the close-command switch 5*b* are at the on state. That is, in step S83, the ECU 1 determines the presence or absence of open or close command input of the outside door handle 7 while the slide door 22 is being operated in the closing direction. When the ECU 1 determines, in step S83, the presence of the open or close command input of the outside door handle 7 while the slide door 22 is being operated in the closing direction, the program returns to step S81 so as to start again an activation of the drive motor 14 in a reverse rotational direction.

On the other hand, when the ECU 1 determines, in step S83, the absence of the open or close command input of the outside door handle 7 while the slide door 22 is being operated in the closing direction, the program proceeds to step S84, wherein the ECU 1 determines whether only the open-command switch 5*a* is at the on state. In step S84, the ECU 1 determines the presence or absence of an open command input of the inside door handle 6 while the slide door 22 is being operated in the closing direction. When the ECU 1 determines, in step S84, the presence of the open command input of the inside door handle 6, the program proceeds to step S60, wherein the ECU 1 activates the drive motor 14 for the opening operation, i.e., operates the slide door 22 in the opening direction.

Since the activation of the drive motor 14 for the closing operation, i.e., the operation of the slide door 22 in the closing direction, in step S82, when the ECU 1 does not recognize the open or close command input of the outside door handle 7 and the open command input of the inside door handle 6, the program proceeds to step S85, wherein the ECU 1 determines whether an actual or current condition of the slide door 22 has satisfied the fully closed condition, on the basis of a monitoring result of the condition monitoring means. When the ECU 1 determines that the actual or current condition of the slide door 22 has satisfied the fully closed condition, the program proceeds to step S90, wherein the ECU 1 terminates activation of the drive motor 14 and stops the operation of the slide door 22. On the other hand, when the ECU 1 determines that the actual or current condition of the slide door 22 has not satisfied the fully closed condition, the program returns to step S82 so as to continue the activation of the drive motor 14 for the closing operation, i.e., the operation of the slide door 22 in the closing direction.

When the ECU 1 determines in step S81 that the drive motor 14 is being activated for the closing operation, i.e., the slide door 22 is being operated in the closing direction, the program proceeds to step S86. In step S86, the ECU 1 activates the drive motor 14 in a reverse rotational direction (opening operation) and operates the slide door 22 in the opening direction. In step S87, the ECU 1 determines whether both of the open-command switch 5*a* and the close-command switch 5*b* are at the on state. That is, in step S87, the ECU 1 determines the presence or absence of the open or close command input of the outside door handle 7 while the slide door 22 is being operated in the opening direction. When the ECU 1 determines, in step S87, the presence of the open or close command input of the outside door handle 7 while the slide door 22 is being operated in the opening direction, the program returns to step S81 so as to start again an activation of the drive motor 14 in a reverse rotational direction.

On the other hand, when the ECU 1 determines, in step S87, the absence of the open or close command input of the outside door handle 7 while the slide door 22 is being operated in the opening direction, the program proceeds to step S88, wherein the ECU 1 determines whether only the close-command switch 5*b* is at the on state. In step S88, the ECU 1 determines the presence or absence of an open command input of the inside door handle 6 while the slide door 22 is being operated in the opening direction. When the ECU 1 determines, in step S88, the presence of the close command input of the inside door handle 6, the program proceeds to step S70, wherein the ECU 1 activates the drive motor 14 for the closing operation, i.e., operates the slide door 22 in the closing direction.

Since the activation of the drive motor 14 for the opening operation, i.e., the operation of the slide door 22 in the opening direction, in step S86, when the ECU 1 does not recognize the open or close command input of the outside door handle 7 and the close command input of the inside door handle 6, the program proceeds to step S89, wherein the ECU 1 determines whether an actual or current condition of the slide door 22 has satisfied the fully open condition. When the ECU 1 determines that the actual or current condition of the slide door 22 has satisfied the fully open condition, the program proceeds to step S90, wherein the ECU 1 terminates activation of the drive motor 14 and stops the operation of the slide door 22. On the other hand, when the ECU 1 determines that the actual or current condition of the slide door 22 has not satisfied the fully open condition, the program returns to step S86 so as to continue the activation of the drive motor 14 for the opening operation, i.e., the operation of the slide door 22 in the opening direction.

As described above, although the opening and closing member control apparatus according to the embodiment of the present invention is provided with only two command receiving means such as the open-command receiving means and the close-command receiving means, it is possible to identify three respective types of operations: 1) a state in which the open-command receiving means receives an open command; 2) a state in which the close-command receiving means receives a close command; and 3) a state in which the open-command receiving means receives an open command and the close-command receiving means receives a close command. It is further possible to control the opening and closing member-driving means in response to the respective input command. Moreover, it is possible to control an opening and closing operation of the opening and closing member appropriately on the basis of a condition of the opening and closing member. Accordingly, for example in the opening and closing member control apparatus which allows selectively implementing an open command input and a close command input by an inside door handle provide inside of a vehicle and allows implementing a open and close command input, which does not specifies an opening and closing operation of the opening and closing member, by an outside door handle provided outside of the vehicle.

As described above, when the unique operation of the second open and close command inputting means, which is associated with the second open command input and the second close command input, is performed while the opening and closing member remains stationary at a closed state, the controlling means considers a command input of the second open and close command inputting means as an open command input and activates the opening and closing member-driving means for the opening operation. When the unique operation of the second open and close command inputting means, which is associated with the second open command input and the second close command input, is performed while the opening and closing member remains stationary at an open state, the controlling means considers a command input of the second open and close command inputting means as a close command input and activates the opening and closing member-driving means for the closing operation. That is, when the opening and closing member remains stationary at a closed state, it is no problem that activation of the opening and closing member-driving means for the opening operation is assumed or considered as an intention of a user. Therefore, even if one of the open command input and the close command input is not selectively implemented, the opening and closing member-driving means is activated on the basis of the intention. Likewise, when the opening and closing member remains stationary at an open state, it is no problem that activation of the opening and closing member-driving means for the closing operation is assumed or considered as an intention of a user. Therefore, even if one of the open command input and the close command input is not selectively implemented, the opening and closing member-driving means is activated on the basis of the intention.

As described above, when the unique operation of the second open and close command inputting means, which is associated with the second open command input and the second close command input, is performed while the opening and closing member is closing, the controlling means considers a command input of the second open and close command inputting means as an open command input and activates the opening and closing member-driving means for the opening operation. When the unique operation of the second open and close command inputting means, which is associated with the second open command input and the second close command input, is performed while the opening and closing member is opening, the controlling means considers a command input of the second open and close command inputting means as a close command input and activates the opening and closing member-driving means for the closing operation. That is, when the opening and closing is moving in the closing direction, it is no problem that activation of the opening and closing member-driving means for the opening operation is assumed or considered as an intention of a user. Therefore, even if one of the open command input and the close command input is not selectively implemented, the opening and closing member-driving means is activated on the basis of the intention. Likewise, when the opening and closing member is moving in the opening direction, it is no problem that activation of the opening and closing member-driving means for the closing operation is assumed or considered as an intention of a user. Therefore, even if one of the open command input and the close command input is not selectively implemented, the opening and closing member-driving means is activated on the basis of the intention.

<1> According to the above-described embodiment of the present invention, the ECU 1 determines that the abnormal stop condition of the slide door 22 has been satisfied, when the condition monitoring means monitors or senses a condition in which an obstacle is being entrapped between the opening and the slide door 22.

Alternatively or in addition, the ECU 1 can determine, on the basis of other parameters, that the abnormal stop condition of the slide door 22 has been satisfied. For example, when the slide door 22 is operated in the opening direction in circumstances where a fill opening lid 23 (see FIG. 1) is open, there is a possibility that the slide door 22 impacts with the fill opening lid 23. In such case, the ECU 1 can consider the open fill opening lid 23 as an obstacle against the slide door 22. The ECU 1 therefore can determine that the abnormal stop condition of the slide door 22 has been satisfied when the slide door 22 is operated at an event that the fill opening lid 23 is open.

The ECU 1 activates the drive motor 14 for the opening/closing operation on the basis of the open/close command input of the inside door handle 6, at a time that the slide door 22 remains stationary abnormally, i.e., when the slide door 22 remains stationary at a position being different from the fully open state and the fully closed state. Moreover, when the slide door 22 remains stationary abnormally, the ECU 1 can activate the drive motor 14 for the opening or closing operation on the basis of the command input of the outside door handle 7. It is, however, necessary in this case to predetermine the operation of the drive motor 14 between the opening operation and the closing operation. For example, alternatively or in addition, in response to the open or close command input of the outside door handle 7, the ECU 1 an automatically activate the drive motor 14 for the opening operation, can automatically activate the drive motor 14 for the closing operation and so on. Still moreover, alternatively or in addition, the ECU 1 can automatically determine the operation of the slide door 22 in the opening or closing operation on the basis of the current position of the slide door 22. For example, the ECU 1 can operate the slide door 22 in the closing direction when the slide door 22 is currently located closer to the fully closed position than the fully open position, wile the ECU 1 can operate the slide door 22 in the opening direction when the slide door 22 is currently located closer to the fully open position than the fully closed position.

<2> According to the above-described embodiment of the present invention, the inside door handle 6 is taken as a non-limiting example of the first open and close command inputting means which selectively implements an open command input, by which an open command is inputted into the open-command receiving means, and a close command input, by which a close command is inputted into the close-command receiving means. The outside door handle 7 is taken as a non-limiting example of the second open and close command inputting means which implements, by a unique operation of the outside inputting means, the close command input and the open command input and is provided individually or separately from the first open and close command inputting means. The embodiment of the present invention is not restrictedly construed to the aforementioned combination. Alternatively or in addition, the inside door handle 6 can serve as the second open and close command inputting means, while the outside door handle 7 can serve as the first open and close command inputting means. Further, a switch 8, which is allocated at or near a driver's seat, or a wireless switch 9, which is equipped to a wireless remote controller, can be taken as non-limiting examples of the second open and close command inputting means and the first open and close command inputting means.

<3> According to the embodiment of the present invention, the opening and closing member control apparatus is employed for controlling an opening and closing operation of the slide door 22. Alternatively or in addition, the opening and closing member control apparatus can serve for controlling an opening and closing operation not only of the slide door 2 but also of a back door which is provided at a back portion of the vehicle.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An opening and closing member control apparatus comprising:

an opening and closing member-driving means for driving an opening and closing member provided at a vehicle;

a condition monitoring means for monitoring a condition of the opening and closing member;

a condition storing means for storing, therein, the condition of the opening and closing member monitored by the condition monitoring means;

an open-command receiving means for receiving an open command by which the opening and closing member-driving means is activated for opening the opening and closing member;

a close-command receiving means for receiving a close command by which the opening and closing member-driving means is activated for closing the opening and closing member;

a first open and close command inputting means for selectively performing a first open command input, by which the open command is inputted to the open-command receiving means, and a first close command input, by which the close command is inputted to the close-command receiving means;

a second open and close command inputting means separated from the first open and close command inputting means and for performing, in response to a unique-directional operation of the second open and close command inputting means, a second open command input, by which the open command is inputted to the open-command receiving means, and a second close command input, by which the close command is inputted to the close-command receiving means; and a controlling means for determining an activation of the opening and closing member-driving means between an opening operation for opening the opening and closing member and a closing operation for closing the opening and closing member based on a condition of the opening and closing member and for controlling the opening and closing member-driving means based on the determination, when the unique-directional operation of the second open and close command inputting means, which is associated with the second open command input and the second close command input, is performed.

2. An opening and closing member control apparatus according to claim 1, wherein, when the unique-directional operation of the second open and close command inputting means, which is associated with the second open command input and the second close command input, is performed while the opening and closing member is being operated in a closing direction, the controlling means activates the opening and closing member-driving means for the opening operation of the opening and closing member, and wherein, when the unique-directional operation of the second open and close command inputting means is performed while the opening and closing member is being operated in an opening direction, the controlling means activates the opening and closing member-driving means for the closing operation of the opening and closing member.

3. An opening and closing member control apparatus according to claim 1, further comprising:

a driving force transmitting condition switching means for switching a driving force transmission from the opening and closing member-driving means to the opening and closing member between a driving force transmitting state and a driving force non-transmitting state, and wherein the controlling means controls the driving force transmitting condition switching means to establish the driving force non-transmitting state when a monitoring result of the condition monitoring means satisfies an abnormal stop condition of the opening and closing member.

4. An opening and closing member control apparatus according to claim 2, further comprising:

a driving force transmitting condition switching means for switching a driving force transmission from the opening and closing member-driving means to the opening and closing member between a driving force transmitting state and a driving force non-transmitting state, and wherein the controlling means controls the driving force transmitting condition switching means to establish the driving force non-transmitting state when a monitoring result of the condition monitoring means satisfies an abnormal stop condition of the opening and closing member.

5. An opening and closing member control apparatus according to claim 1, wherein the controlling means determines a presence or absence of the second close command input when the opening and closing member is operated in an opening direction.

6. An opening and closing member control apparatus according to claim 1, wherein the controlling means determines a presence or absence of the second open command in put when the opening and closing member is operated in a closing direction.

7. An opening and closing member control apparatus according to claim 1, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

8. An opening and closing member control apparatus according to claim 7, wherein the one of the opening operation and the closing operation of the opening and closing member-driving means is determined based on a position of the opening and closing member.

9. An opening and closing member control apparatus according to claim 2, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

10. An opening and closing member control apparatus according to claim 3, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

11. An opening and closing member control apparatus according to claim 4, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

12. An opening and closing member control apparatus according to claim 5, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

13. An opening and closing member control apparatus according to claim 6, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

14. An opening and closing member control apparatus according to claim 1, wherein, when the unique-directional operation of the second open and close command inputting means, which is associated with the second open command input and the second close command input, is performed while the opening and closing member remains stationary at a closed state, the controlling means activates the opening and closing member-driving means for the opening operation of the opening and closing member, and wherein, when the unique-directional operation of the second open and close command inputting means is performed while the opening and closing member remains stationary at an open state, the controlling means activates the opening and closing member-driving means for the closing operation of the opening and closing member.

15. An opening and closing member control apparatus according to claim 14, wherein, when the unique-directional operation of the second open and close command inputting means, which is associated with the second open command input and the second close command input, is performed while the opening and closing member is being operated in a closing direction, the controlling means activates the opening and closing member-driving means for the opening operation of the opening and closing member, and wherein, when the unique-directional operation of the second open and close command inputting means is performed while the opening and closing member is being operated in an opening direction, the controlling means activates the opening and closing member-driving means for the closing operation of the opening and closing member.

16. An opening and closing member control apparatus according to claim 14, further comprising:

a driving force transmitting condition switching means for switching a driving force transmission from the opening and closing member-driving means to the opening and closing member between a driving force transmitting state and a driving force non-transmitting state, and wherein the controlling means controls the driving force transmitting condition switching means to establish the driving force non-transmitting state when a monitoring result of the condition monitoring means satisfies an abnormal stop condition of the opening and closing member.

17. An opening and closing member control apparatus according to claim 14, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

18. An opening and closing member control apparatus according to claim 15, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

19. An opening and closing member control apparatus according to claim 16, wherein, when at least one of operations: 1) an operation of the first open and close command inputting means associated with one of the first open command input and the first close command input; and 2) the unique-directional operation of the second open and close command inputting means, which is associated with one of the second open command input and the second close command input, is performed, in a circumstance where the opening and closing member remains stationary at a position being different from a fully open state and a fully closed state, the controlling means activates the opening and closing member-driving means for one of the opening operation, and the closing operation, of the opening and closing member.

20. An opening and closing member control apparatus comprising:

an opening and closing member-driving means for driving an opening and closing member provided at a vehicle;

a condition monitoring means for monitoring a condition of the opening and closing member;

a condition storing means for storing, therein, the condition of the opening and closing member monitored by the condition monitoring means;

an open-command receiving means for receiving an open command by which the opening and closing member-driving means is activated for opening the opening and closing member;

a close-command receiving means for receiving a close command by which the opening and closing member-driving means is activated for closing the opening and closing member;

a first open and close command inputting means for selectively performing a first open command input, by which the open command is inputted to the open-command receiving means, and a first close command input, by which the close command is inputted to the close-command receiving means;

a second open and close command inputting means separate from the first open and close command inputting means for performing, when the second open and close command inputting means is operated in a single direction, both a second open command input, by which the open command is inputted to the open-command receiving means, and a second close command input, by which the close command is inputted to the close-command receiving means; and a controlling means for determining an activation of the opening and closing member-driving means between an opening operation for opening the opening and closing member and a closing operation for closing the opening and closing member based on a condition of the opening and closing member and for controlling the opening and closing member-driving means based on the determination, when the second open and close command inputting means is operated in the single direction.

* * * * *